US008781916B1

(12) United States Patent
Buryak

(10) Patent No.: US 8,781,916 B1
(45) Date of Patent: Jul. 15, 2014

(54) PROVIDING NUANCED PRODUCT RECOMMENDATIONS BASED ON SIMILARITY CHANNELS

(75) Inventor: Kirill Buryak, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/475,083

(22) Filed: May 18, 2012

(51) Int. Cl.
*G06Q 30/00* (2012.01)

(52) U.S. Cl.
USPC ............................................. 705/26.7

(58) Field of Classification Search
CPC .......................................... G06Q 30/06–30/08
USPC .................................... 705/26–27, 26.1–27.2
See application file for complete search history.

(56) References Cited

U.S. PATENT DOCUMENTS

| | | | |
|---|---|---|---|
| 7,421,725 | B2 | 9/2008 | Hane et al. |
| 2002/0157096 | A1* | 10/2002 | Hane et al. ............ 725/46 |
| 2006/0059135 | A1 | 3/2006 | Palmon et al. |
| 2007/0005563 | A1 | 1/2007 | Aravamudan et al. |
| 2008/0140643 | A1 | 6/2008 | Ismalon |
| 2008/0208820 | A1 | 8/2008 | Usey et al. |
| 2008/0295133 | A1* | 11/2008 | Pronk et al. ............ 725/46 |
| 2009/0299853 | A1 | 12/2009 | Jones et al. |
| 2010/0205180 | A1 | 8/2010 | Cooper et al. |
| 2011/0029464 | A1* | 2/2011 | Zhang et al. ............ 706/12 |
| 2012/0233154 | A1 | 9/2012 | Walther et al. |
| 2012/0265779 | A1 | 10/2012 | Hsu et al. |

OTHER PUBLICATIONS

Heller, K., "Efficient Bayesian Methods for Clustering," Thesis, University of London, 2007, pp. 1-129.
Sato, I., et al., "Bayesian Document Generative Model with Explicit Multiple Topics," Proceedings of the 2007 Joint Conference on Empirical Methods in Natural Language Processing and Computational Natural Language Learning, Prague, Jun. 2007, pp. 421-429.
Uszkoreit, J., et al., "Distributed Word Clustering for large Scale Class-Based Language Modeling in Machine Translation," 2008, 8 Pages.
Weng, S-S., et al., "Applying Bayesian Network and Association Rule Analysis for Product Recommendation," International Journal of Electronic Business Management, 2011, pp. 149-159, vol. 9, No. 2.
Stackoverflow, "Naïve Bayesian for Topic detection using "Bag of Words" approach," Stack Exchange Inc., 2012, 2 pages, [online][retrieved on May 23, 2012] Retrieved from the internet <URL: http://stackoverflow.com/questions/2781752/naive-bayesian-for-topic-detection-using-bag-of-words-approach>.

(Continued)

*Primary Examiner* — Ethan D Civan
(74) *Attorney, Agent, or Firm* — Johnson, Marcou & Isaacs, LLC

(57) ABSTRACT

Embodiments of the method include receiving, from a client device, a request for products similar to a target product. The request specifies a similarity channel for the target product that indicates one or more themes. Thereafter, a set of products similar to the target product is identified, where each of the products in the set shares in common with the target product at least one of the themes indicated by the similarity channel. After identifying the set of similar products, the set is ranked according to a similarity of each product in the set to the target product. Subsequently, the set of ranked products is provided to the client device.

18 Claims, 7 Drawing Sheets

(56) References Cited

OTHER PUBLICATIONS amazon.com, Product Details and Reviews for movie "The Time Traveler's Wife (2009)" 6 pages, [online][retrieved on May 17, 2012] Retrieved from the internet <URL: www.amazon.com/Time-Travelers-Wife-Rachel-McAdams/dp/B001HN69C2/ref=sr_1_1?le=UTF8&qld= . . . >.

"Text classification and Naive Bayes," Cambridge University Press, 2008, 2 pages, [online][retrieved on May 23, 2012] Retrieved from the internet <URL:http://nlp.stanford.edu/IR-book/html/htmledition/text-classification-and-naive-bayes-l.html>.

U.S. Appl. No. 13/531,147, filed Jun. 22, 2012.

Internet Article: eBay: Turbo Lister FAQ—Seller Tools retrieved from http://pages.ebay.com/turbolister http://pages.ebay.com/turbolister2/faq.html pp. 1-2 Nov. 30, 2010.

Internet Article: eBay: Turbo Lister—Seller Tools—List Multiple Items and Upload to eBay in Bulk! http://pages.ebay.com/turbo_lister pp. 1-2 Nov. 30, 2010.

eBay—Turbo Lister Listing Activity Quick Start Guide *eBay File Exchange Catalog Listing Template Intructions* Ver. 1.1 pp. 1-8 Apr. 1, 2007.

Liu et al. Clustering Billions of Images with Large Scale Nearest Neighbor Search *IEEE Workshop on Applications of Computer Vision (WACV'07)* pp. 1-6 Jan. 1, 2007.

Byun, S. C., International Search Report and Written Opinion issued in International Application No. PCT/US2013/070268, pp. 1-10, Mar. 6, 2014.

Hosseini, R., Office Action issued in copending U.S. Appl. No. 13/600,194, filed Aug. 30, 2012, pp. 1-35, Feb. 11, 2014.

\* cited by examiner

PROVIDING NUANCED PRODUCT RECOMMENDATIONS BASED ON SIMILARITY CHANNELS

BACKGROUND

1. Field of Disclosure

This disclosure relates generally to product recommendation, and more particularly to providing nuanced product recommendations based on similarity channels.

2. Description of the Related Art

Various systems currently exist for recommending products based on a determined "likeness" to a product indicated by a user. For example, a user may indicate that he or she likes a particular movie. Responsive to such an indication, a product recommendation system may provide a list of other movies that are determined to be similar to the movie indicated by the user.

A common problem with current product recommendation systems is that such systems lack flexibility for finely tuning recommendations. For example, a user may be interested in a Civil War aspect of a particular book rather than a romance aspect of the same book. Current recommendations systems are only able to provide recommendations based on both the Civil War and romance aspects. As a result, the recommendations returned to the user might include books that are not particularly relevant (e.g., romance books). As such, the recommendations provided to the user may be suboptimal and not particularly useful.

SUMMARY

The above and other issues are addressed by a method, a non-transitory computer-readable storage medium, and a system for providing nuanced product recommendations based on similarity channels.

Embodiments of the method include receiving, from a client device, a request for products similar to a target product. The request specifies a similarity channel for the target product that indicates one or more themes. Thereafter, a set of products similar to the target product is identified, where each of the products in the set shares in common with the target product at least one of the themes indicated by the similarity channel. After identifying the set of similar products, the set is ranked according to a similarity of each product in the set to the target product. Subsequently, the set of ranked products is provided to the client device.

Embodiments of the computer-readable storage medium store computer-executable instructions for performing the steps described above. Embodiments of the system further include a processor for executing the computer-executable instructions.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
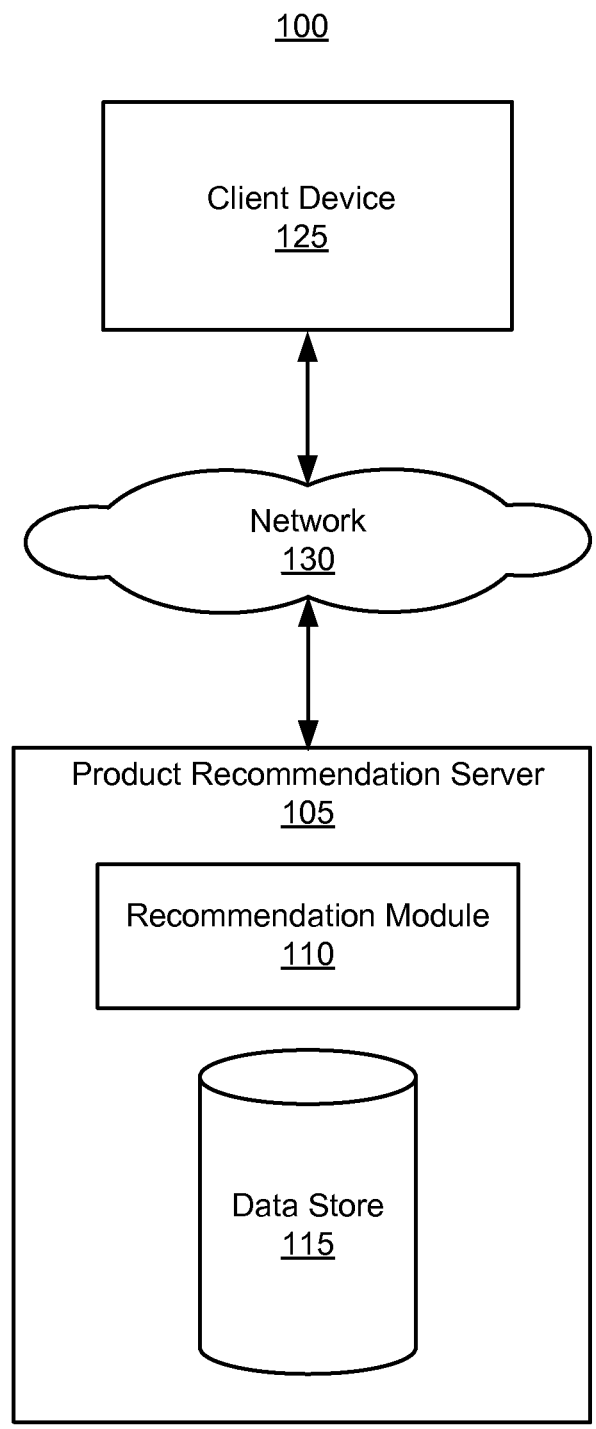
FIG. 1 is a high-level diagram illustrating a typical environment used for recommending products based on similarity channels according to one embodiment.

FIG. 1 is a high-level block diagram illustrating a typical environment 100 used for recommending products based on similarity channels. In one embodiment, the recommended products are selected from a product catalog (e.g., a catalog of books or movies). Each product in the catalog may be associated with several thematic dimensions (also referred to as "themes") that describe thematic characteristics of the product. For example, a particular book in the catalog may have a romance thematic dimension, a first love thematic dimension, a 1970s thematic dimension, and a sentimental thematic dimension. Each of the aforementioned dimensions may describe a particular characteristic of the book.

In one embodiment, each of a product's thematic dimensions (or themes) belongs to a particular thematic category. The thematic category may encompass multiple dimensions and may describe an overarching label or description for its dimensions. For instance, the available categories in which dimensions may be categorized may include a genre category, a plot category, a time period category, and a mood category. The genre category may encompass thematic dimensions related to genre, such as a romance dimension, a murder-mystery dimension, a comedy dimension, a science-fiction dimension, etc. The plot category may encompass thematic dimensions related to plotlines, such as a time-travel dimension, a first love dimension, a race across the country dimension, etc. The time period category may encompass thematic dimensions related to a particular time period, such as a 1930s dimension, a renaissance dimension, a prehistoric dimension, etc. The mood category may encompass thematic dimensions related to the overall mood of a product, such as a sentimental dimension, a joyful dimension, a hopeful dimension, etc.

In one aspect, a user selects a target product from the product catalog, and initiates a request for a list of products that are similar to the target product. The user may additionally specify certain thematic dimensions of the target product that are to be considered when identifying the similar products. As an example, a user may indicate that any identified products have a similar 1970s dimension and a similar sentimental dimension as a book. The specific combination of a target product's thematic dimensions across which similar products are identified is referred to herein as a "similarity channel."

Referring again to FIG. 1, the environment 100 includes a client device 125 in communication with a product recommendation server 105 via a network 130. Only one client device 125 and one product recommendation server 105 are shown in FIG. 1 for purposes of clarity, but those of skill in the art will recognize that typical environments can have hundreds or thousands of client devices 125, and can also have multiple product recommendation servers 125.

The network 130 enables communications between the client device 125 and the product recommendation server 105. In one embodiment, the network 130 uses standard communications technologies and/or protocols and includes the Internet. Thus, the network 130 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 130 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

The client device 125 is an electronic device operated by a user to receive nuanced product recommendations based on a similarity channel. In one embodiment, a user may desire to receive a list of products that are similar to a target product. In order to receive the list, the user browses an online product catalog displayed by the client device 125, and selects the target product from the catalog. To see recommendations of similar products, the user additionally selects a combination of the target product's thematic dimensions (i.e., the similarity channel) to be considered when identifying the similar products.

Upon receiving the product and similarity channel selections, the client 125 sends a request for product recommendations to the product recommendation server 105. Responsive to the request, the client device 125 receives a ranked list of products similar to the target product from the product recommendation server 105. The received list may thereafter be presented by the client device 125 to the user. For example, the client device 125 may provide, for display, a user interface that includes the list of similar products.

In one embodiment, the client device 125 communicates with the product recommendation server 125 by exchanging data over the network 130. The client device 125 may be any type of computer system, such as a laptop, desktop, workstation, or server. The client device 125 may also be another device having computer functionality, such as a personal digital assistant (PDA), mobile telephone, tablet device, gaming console, etc. The client device 125 may moreover execute a suitable operating system, such as a Microsoft Windows-compatible operating system (OS), Apple OS X, UNIX, and/or a Linux distribution.

The product recommendation server 105 recommends products based on similarity channels. As shown in FIG. 1, the product recommendation server 105 includes a recommendation module 110 and a data store 115. The data store 115 generally stores aggregated data associated with the products of a product catalog. The aggregated data can include, for example, descriptions for the products, product manuals, the text of the products (e.g., the text of a book), reviews for the products, user comments discussing the products, and/or any other suitable information related to the products. The aggregated data can be used by the recommendation module 110 to support product recommendation. In one embodiment, the data store 115 additionally stores data generated by the recommendation module 110. The generated data can also be used to support product recommendation.

In one embodiment, the recommendation module 110 identifies one or more products similar to a specified target product. More specifically, the recommendation module may receive a request for a list of products similar to a particular target product from a client device 125. The request may identify the target product and a specific similarity channel. In response to receiving the request, the recommendation module 110 identifies products similar to the target product for each dimension (or theme) indicated in the similarity channel. For example, a particular book may have a romance dimension, a 1970s dimension, and a sentimental dimension. A user may request that a list of products be returned that are of the same 1970s time period and/or have the same sentimental mood as the book. In response, the recommendation module 110 identifies a set of products that have the same 1970s time period as the book. The recommendation module 110 additionally identifies a set of products that have the same sentimental mood as the book. Following identification of the similar products, the similar products are merged and ranked into a single list. The product recommendation server 105 then sends the list of products to the user's client device 125 for presentation to the user.

In one embodiment, identification of similar products may be performed by constructing and using a set of clustering models. Each of the clustering models may include a different clustering of the same products for a particular thematic category. For example, a first clustering model may cluster products according to a genre category. Another clustering model may cluster products according to a time period category. In one embodiment, the clustering models may each be generated by employing unsupervised machine learning clustering algorithms. Further details regarding the construction and usage of clustering models will be described in greater detail below.

By identifying similar products based on only those dimensions of interest to a user, the product recommendation server 105 enables its users to precisely tune their product searches. For example, a user may wish to receive recommendations for products similar to the movie "Time Traveler's Wife," which includes both a romance dimension and time-travel dimension. The product recommendation server 105 enables the user to select only the time-travel dimension of the "Time Traveler's Wife." Responsive to such a selection, the product recommendation server 105 may recommend similar products, such as the movies "Back to the Future" and "The Terminator," which feature time-travel. At a later time, a different user may select only the romance dimension of "The Time Traveler's Wife." Responsive to such a selection, the product recommendation server 105 may recommend a different set of similar products. For instance, the server may recommend movies such as "Forever Young" and "Breakfast at Tiffany's," which feature romance. By enabling users to tune product recommendations based on specific thematic dimensions, the product recommendation server 105 enables users to receive more relevant and interesting product recommendations.

Furthermore, rather than manually generating clustering models, specialized algorithms (e.g., specialized machine learning algorithms) are employed to automatically accomplish such tasks. As a result, developing and maintaining the product recommendation server 105 can be made less labor-intensive and time-consuming. As such, the cost and speed of deploying the product recommendation server 105 can be improved.

Figure 2:
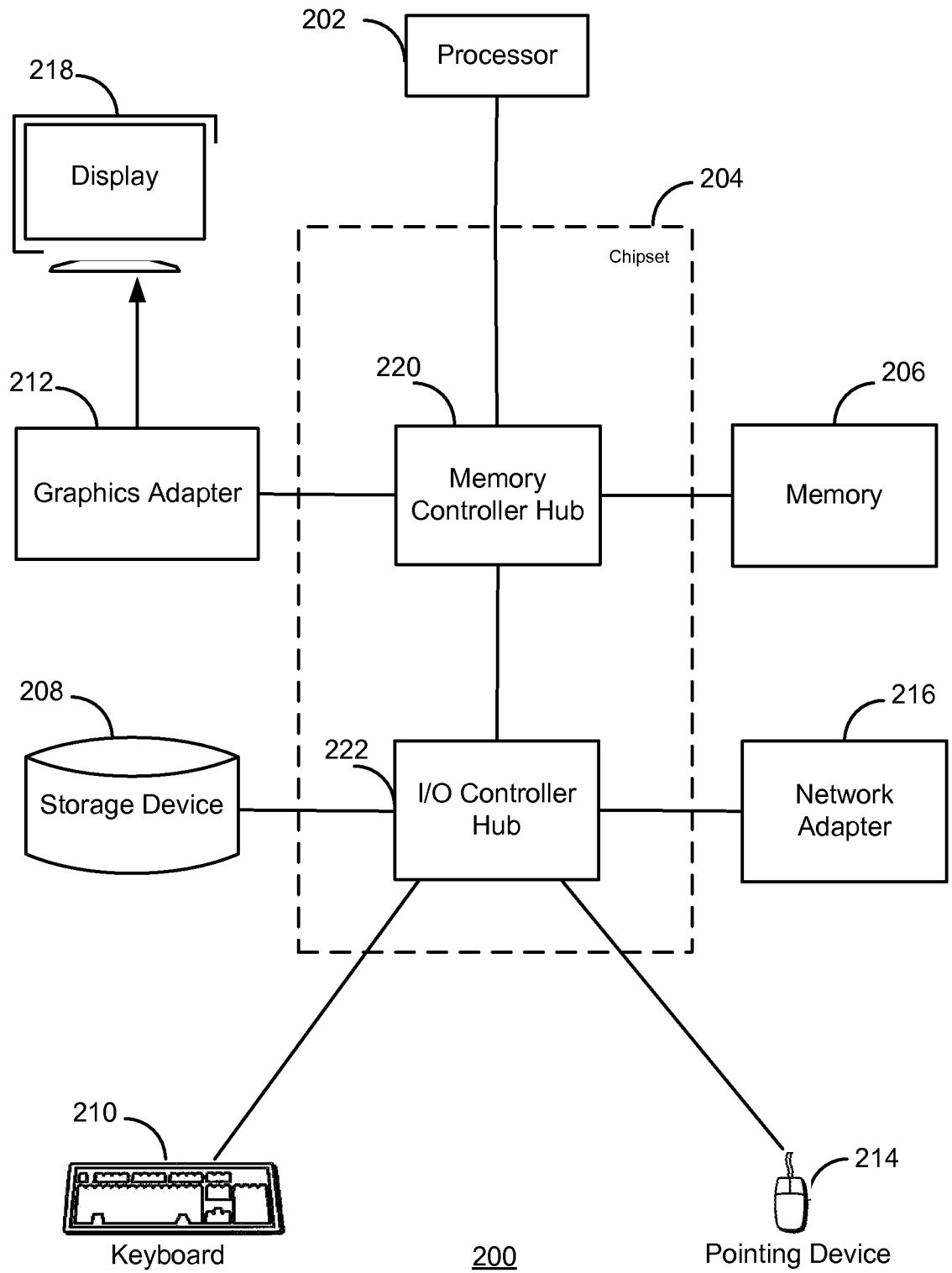
FIG. 2 is a high-level block diagram of a computer system for recommending products based on similarity channels according to one embodiment.

FIG. 2 is a high-level block diagram of a computer 200 for use as the client device 125 and/or the product recommendation server 105 according to one embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of to the chipset 204.

The storage device 208 is a non-transitory computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 130.

As is known in the art, a computer 200 can have different and/or other components than those shown in FIG. 2. In addition, the computer 200 can lack certain illustrated components. In one embodiment, a computer 200 acting as the product recommendation server 105 is formed of multiple blade computers and lacks a keyboard 210, pointing device 214, graphics adapter 212, and/or display 218. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Figure 3:
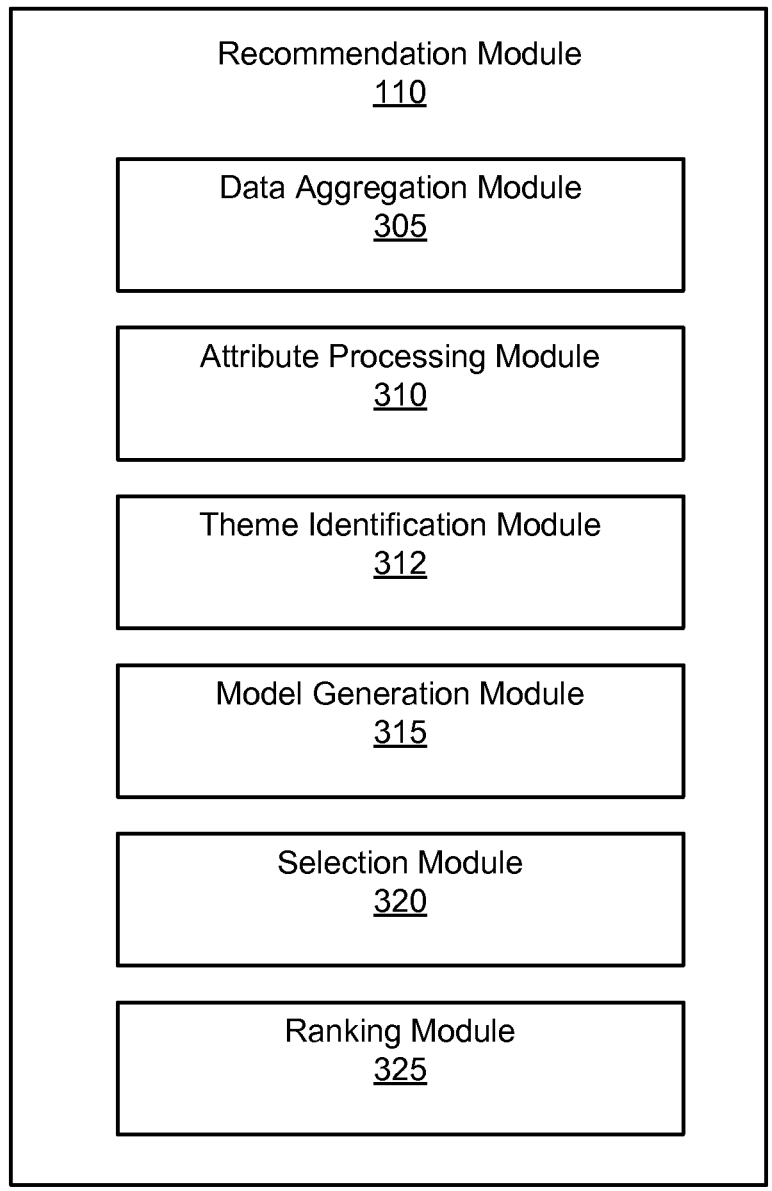
FIG. 3 is a high-level block diagram illustrating a detailed view of modules within a recommendation module according to one embodiment.

FIG. 3 is a high-level block diagram illustrating a detailed view of modules within the recommendation module 110 according to one embodiment. Some embodiments of the recommendation module 110 have different and/or other modules than the ones described herein. Similarly, the functions can be distributed among the modules in accordance with other embodiments in a different manner than is described here. Likewise, the functions can be performed by other entities.

The recommendation module 110 includes modules for performing various functions. These modules include a data aggregation module 305, an attribute processing module 310, a theme identification module 312, a model generation module 315, a selection module 320, and a ranking module 325. The modules 305, 310, 312, 315, 320, and 325 include functionality corresponding to the functionality invoked on the product recommendation server 105 for providing nuanced product recommendations based on similarity channels.

Data Aggregation

The data aggregation module 305 aggregates and stores data describing a set of products, including official product descriptions, product user manuals, customer reviews regarding the products, critical reviews of the products, the actual textual contents of the products (e.g. the text of the book, the subtitles of a movie, the lyrics of a song, etc.), and/or the like. Such data includes textual information that can be used to identify the various attributes and/or dimensions for a product. For example, a customer review for the book "Time Traveler's Wife" may mention the terms time-travel, Chicago, romance, etc. Likewise, the actual text of the book may mention the aforementioned terms with a frequency that indicates that the terms have a high degree of importance with respect to the book. As a result, the terms may be selected as product attributes for the book.

The data aggregation module 305 may obtain the product data from one or more suitable sources. For example, the data aggregation module 305 may obtain product descriptions and customer reviews from an inventory system of an online retailer, critical reviews from the website of an online magazine, the actual textual content from a book publisher, etc. In aggregating the product data, the data aggregation module 305 may perform a cleaning process in order to ensure that the product data is in a suitable format for further processing. For example, the data aggregation module 305 may structure the information according to the extensible markup language (XML). As another example, the data aggregation module 305 may remove irrelevant information. Illustratively, certain customer reviews may include information that is not particularly relevant to a product. For instance, a user may, in his review of a book, additionally discuss his experience with the online retailer that sold him the book. Such retailer information may be determined not to be relevant to the book, and may be removed from the product data.

Product Attribute Identification

The attribute processing module 310 analyzes the aggregated product data to identify set of product attributes for the products. An attribute may be a word, term, phrase (also known as n-grams, or a combination of two or more words that represent a single entity such as "George Washington" or "Indiana Jones") that may be of relevance to searchers of the product. For example, an attribute may be a specific keyword that describes an important or interesting aspect of the product. For instance, an attribute for a book may tend to describe a particular plot line for the book.

In one embodiment, the attribute processing module 310 employs a term frequency—inverse document frequency (TF-IDF) weighting algorithm to the aggregated product data in order to identify the one or more product attributes for each of the products in the catalog. In another embodiment, the attribute processing module 310 employs an information gain algorithm to identify the product attributes for each of the one or more products. The identified product attributes for each product may include the top ranked words or terms for the product. As an example, the attribute processing module 310 may identify the term "time-travel" as a product attribute for the movie "Back to the Future" because the term is used a relatively large number of times in the aggregated product data for the movie.

Thematic Dimension Identification

The theme identification module 312 determines the specific thematic dimensions for each product based on the product's attributes. As an example, a particular book may be related to the following attributes: mystery, murder, suspect, cliffhanger, thriller, Great Depression and New Deal. Based on the mystery, murder, suspect, cliffhanger, and thriller attributes, the theme identification module 312 may associate the book with a murder mystery dimension. Based on the Great Depression and New Deal attributes, the theme identification module 312 may also associate the book with a 1930s dimension.

Determination of the specific dimensions for a product may be automatically performed by employing various algorithms, such as various specialized machine learning algorithms. In one embodiment, the dimension identification 312 may identify a product's dimensions by employing a hierarchical clustering algorithm. In another embodiment, the theme identification module 312 may identify a product's dimensions by employing an unsupervised Bayesian clustering algorithm. In yet another embodiment, the theme identification module 312 may identify a product's dimensions by referencing an attribute-dimension association data structure. Each of the aforementioned embodiments is discussed in further detail below.

A. Dimension Identification Based on Hierarchical Clustering

In one embodiment, the theme identification module 312 determines the specific dimensions for each product by generating and analyzing a taxonomy of the product's attributes. The theme identification module 312 may generate the taxonomy by employing a hierarchical clustering algorithm. The hierarchical clustering algorithm may be used to form the various levels of the taxonomy. To form each individual level of the taxonomy, the hierarchical clustering algorithm may in turn employ a suitable algorithm, such as the Distributed Exchange Algorithm. Further details regarding the Distributed Exchange Algorithm can be found by referencing Uszkoreit, J. and Thorsten Brants, *Distributed Word Clustering for Large Scale Class-Based Language Modeling in Machine Translation*, Proceedings of the 46th Annual Meeting of the Association for Computational Linguistics (ACL), 2008.

In generating the taxonomy using the hierarchical clustering algorithm, the theme identification module 312 first forms a base level of the taxonomy for a product. In forming the base level, the theme identification module 312 employs the Distributed Exchange Algorithm to iteratively cluster the attributes of the product multiple times, where each iteration incrementally improves on the previous iteration's results by attempting to maximize a quality score for a candidate set of clusters.

More specifically, the theme identification module 312 performs a first clustering iteration by clustering the attributes of a product to form a candidate set of clusters. In one embodiment, the theme identification module 312 may randomly cluster the attributes. Thereafter, the theme identification module 312 generates an initial quality score for the candidate set of clusters.

In one aspect, the identification module 312 determines the quality score for the set of clusters based on the frequency in which the attributes of each cluster appear in proximity to one another in the aggregated data for the product. More specifically, the quality score for a candidate set of clusters may be higher if the attributes in a particular cluster of the set often appear within the same sentence in the aggregated data for the product. Illustratively, a particular cluster in a set of clusters may include the attributes: World War II, Normandy, and D-Day. The three attributes may frequently appear together within the same sentence of a book's aggregated data. As such, the quality score for the set of clusters may be higher than if, for example, the particular cluster included attributes that do not commonly appear together in the book's aggregated data. In one embodiment, the quality score may be a mutual information metric. As such, the quality score may be generated by applying a mutual information algorithm to the set of clusters based on the aggregated data for the product.

Thereafter, the theme identification module 312 performs a subsequent clustering iteration. In performing the subsequent clustering iteration, the theme identification module 312 refines the candidate set of clusters. For example, in refining the candidate set of clusters, the theme identification module 312 may move a product attribute from one cluster in the set to another cluster according to the Distributed Exchange Algorithm. After refining the candidate set, the theme identification module 312 computes a subsequent quality score for the candidate set. In one embodiment, the dimension identification 312 may continue to iteratively refine the set of clusters in the manner described. As a result, over time, the incremental improvement in the quality score for the set of clusters following each iteration will decrease. In one embodiment, the theme identification module 312 may terminate the iterative clustering of the product's attributes after a certain number of iterations (e.g., 300 iterations), or in the event the incremental improvement in the quality scores between two consecutive iterations is smaller than a predefined threshold. After termination of the iterative clustering, the refined candidate set of clusters is used to form a base level of the taxonomy.

After forming the base level of the taxonomy, the theme identification module 312 generates a subsequent level of the taxonomy. In particular, the theme identification module 312 iteratively clusters the set of clusters of the base level a number of times. In one aspect, each iteration refines the set of clusters for the subsequent level according to the Distributed Exchange Algorithm. As a result, a quality score for the set of clusters for the subsequent level can be improved over time. In one embodiment, the iterative clustering can performed in a manner similar to the iterative clustering that was performed to form the base level. As a result, a refined candidate set of clusters of the subsequent level is formed, where each cluster of the subsequent level includes one or more clusters of the base level. The refined candidate set of clusters of the subsequent level can be used to form a subsequent level of the taxonomy.

In one embodiment, the theme identification module 312 continues to generate successive levels of the taxonomy in a similar manner. More specifically, the theme identification module 312 may cluster the clusters of a preceding level to generate a successive level. In one embodiment, the formation of successive levels of the taxonomy can proceed until a threshold number of levels are reached. For example, the formation of levels may terminate once the taxonomy reaches four levels.

Following generation of the taxonomy, the clusters in the highest level of the taxonomy may be labeled with specific thematic dimensions. In one embodiment, a domain expert may label the clusters. In another embodiment, the theme identification module 312 may initially label the clusters. More specifically, the theme identification module 312 may label each cluster with a representative attribute of the cluster. For example, a cluster may include the attributes: mystery, detective, clues, and evidence. The theme identification module 312 may randomly select the attribute "mystery" as the specific dimension for the cluster. After initial labeling by the theme identification module 312, a domain expert may review the selected attributes in order to determine the accuracy of the labeling.

Following labeling, the theme identification module 312 analyzes the labels of the generated taxonomy for each product in order to select the specific dimensions for the product. In one aspect, a specific dimension is selected for each of a number of thematic categories. For example, a specific dimension may be selected for each of a genre category, a plot category, a time period category, and a mood category. In one embodiment, the selected dimensions may be those associated with the largest clusters (e.g., those clusters that include the greatest number of attributes) in the taxonomy for each category. For example, the taxonomy for a particular book may include a cluster labeled with a 1980s dimension and also a cluster labeled with a 1990s dimension. Both the dimensions may belong to a time period category. The cluster labeled with the 1990s dimension may include more attributes than the cluster labeled with the 1980s dimension. As such, the theme identification module 312 may select, for the book, the 1990s dimension for the time period category.

Figure 4A:
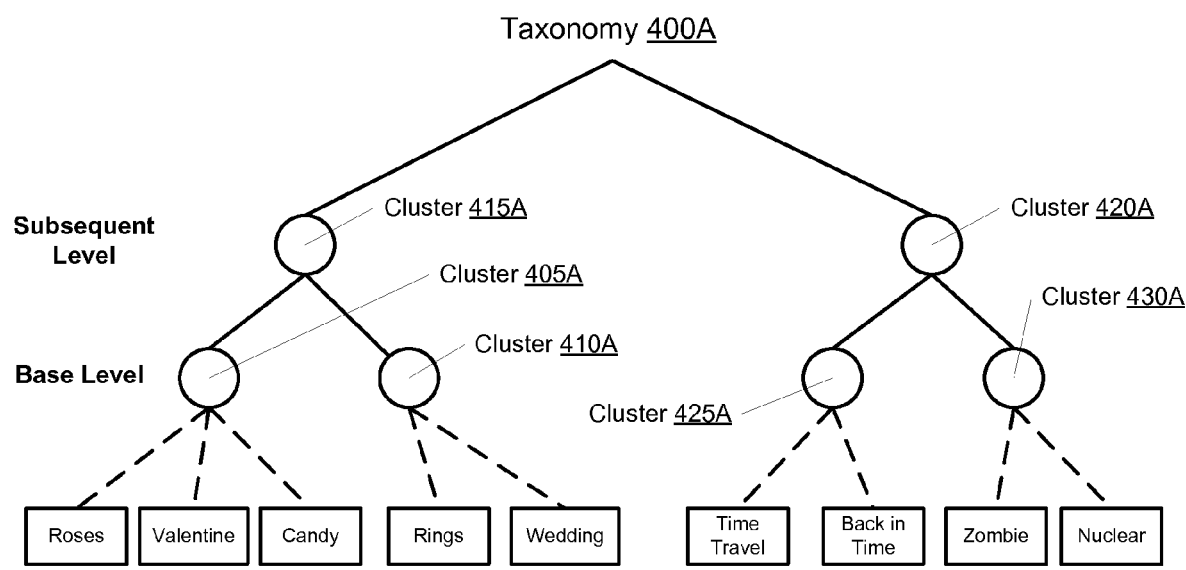
FIG. 4A illustrates an exemplary taxonomy of product attributes generated by a hierarchical clustering algorithm according to one embodiment.

FIG. 4A is a diagram illustrating an exemplary taxonomy 400A of product attributes generated by a hierarchical clustering algorithm. In FIG. 4A, the taxonomy 400A includes the set of clusters: 405A, 410A, 425A, and 430A as its base level. Each cluster includes a set of attributes, which are represented by the boxes connected to the clusters by dashed lines. For example, the cluster 405A includes the attributes: roses, valentine, and candy. In FIG. 4A, the particular set of clusters used for the base level may have been iteratively generated by incrementally improve a quality score for the set.

In FIG. 4A, the taxonomy 400A includes, as a subsequent level, the set of clusters: 415A and 420A. As shown, the cluster 415A of the subsequent level includes the clusters 405A and 410A of the base level. Likewise, the cluster 420A includes the clusters 425A and 430A. As with the base level, the set used for the subsequent level may have been iteratively generated by incrementally improving a quality score for the set. The quality score for the set including the clusters 415A and 420A may have been based on how often the attributes of cluster 405A appear in proximity to the attributes of cluster 410A, and how often the attributes of cluster 425A appear in proximity to the attributes of cluster 430A.

B. Dimension Identification Based on Unsupervised Bayesian Clustering

In another embodiment the theme identification module 312 determines the dimensions for each product by applying an unsupervised Bayesian clustering model to the product's attributes. More specifically, the theme identification module 312 may cluster the attributes for a product based on conditional probabilities for the attributes. In particular, attributes with conditional probabilities between one another that exceed a certain threshold probability may be clustered together. In one embodiment, the conditional probabilities between two different attributes are based on the frequency that the two attributes appear in proximity to one another in the aggregated data of the product. For example, the conditional probabilities between two attributes may be high if the two attributes appear several times within the same sentence in the aggregated data. Illustratively, the theme identification module 312 may compute relatively high conditional probabilities between the attributes "hilarious" and "jokes" because the two attributes appear frequently together in the aggregated data for the product. As a result of the high conditional probabilities, the theme identification module 312 may cluster the two attributes together.

After clustering the attributes, a domain expert supplies a specific dimension to the resulting set of clusters. In another embodiment, the theme identification module 312 automatically labels each cluster with a representative attribute of the cluster. A domain expert may thereafter review the labels. Following labeling, the theme identification module 312 analyzes the clusters to identify the specific dimensions for the product. More specifically, the theme identification module 312 may select, for each of one or more thematic categories, those dimensions associated with the largest clusters. The selected dimensions represent the specific dimensions for the product.

C. Dimension Identification Based on Attribute-Dimension Association Data Structure In still another embodiment, the theme identification module 312 determines the specific dimensions for each product by referencing an attribute-dimension association data structure. In the embodiment, the data structure may include a hierarchical definition of specific dimensions. In particular, for each specific dimension, the data structure specifies one or more attributes associated with the dimension. For example, the attribute-dimension association data structure may include an entry for a 1940s dimension. The entry for the 1940s dimension may include attributes associated with the specific dimension, such as World War II, Alfred Hitchcock, the Manhattan Project, etc. By referencing the attribute-dimension association data structure, the theme identification module 312 can determine one or more dimensions associated with a given product's attributes. In one implementation, the attribute-dimension association data structure may be generated by encoding and storing expert knowledge supplied by a domain expert. For example, a domain expert may input the attributes for each of the one or more dimensions of the attribute-dimension association data structure. After associating the attributes to various dimensions, the theme identification module 312 selects one or more specific dimensions for each product. In one embodiment, the theme identification module 312 may select, for each of one or more thematic categories, those dimensions associated with the greatest number of the product's attributes.

Clustering Model Generation

The model generation module 315 generates clustering models based on the identified attributes and/or dimensions for the one or more products. The clustering models can later be referenced when providing product recommendations. In one embodiment, the model generation module 315 generates a clustering model for each thematic category. For example, the model generation module 315 may generate a model for a genre category, a model for a plot category, a model for a time period category, a model for a mood category, and/or the like. In one embodiment, each clustering model may be generated based on a subset of the product attributes and/or thematic dimensions, where each attribute and/or dimension in the subset is associated with the thematic category for the clustering model. As a result, each clustering model can be used to identify recommendations along a specific thematic dimension for a given thematic category.

In one embodiment, a clustering model for a given category may include a set of clusters of products. Each cluster in the set may include a subset of products associated with the same specific dimension of the given category. For example, a cluster within a clustering model for the genre category may include all those products determined to be associated with the romance dimension. A different cluster within the same clustering model may include all those products associated with the comedy dimension.

In one embodiment, each product is logically arranged or positioned within each cluster based on its similarity to other products in the same cluster. As a result, the logical distance between each product within a cluster may provide an indication as to the relative similarities between the products. More specifically, products closer in distance may be determined to be more similar. In one embodiment, products are arranged closer to one another if the products share similar product attributes and/or have a large number of product attributes in common.

Figure 4B:
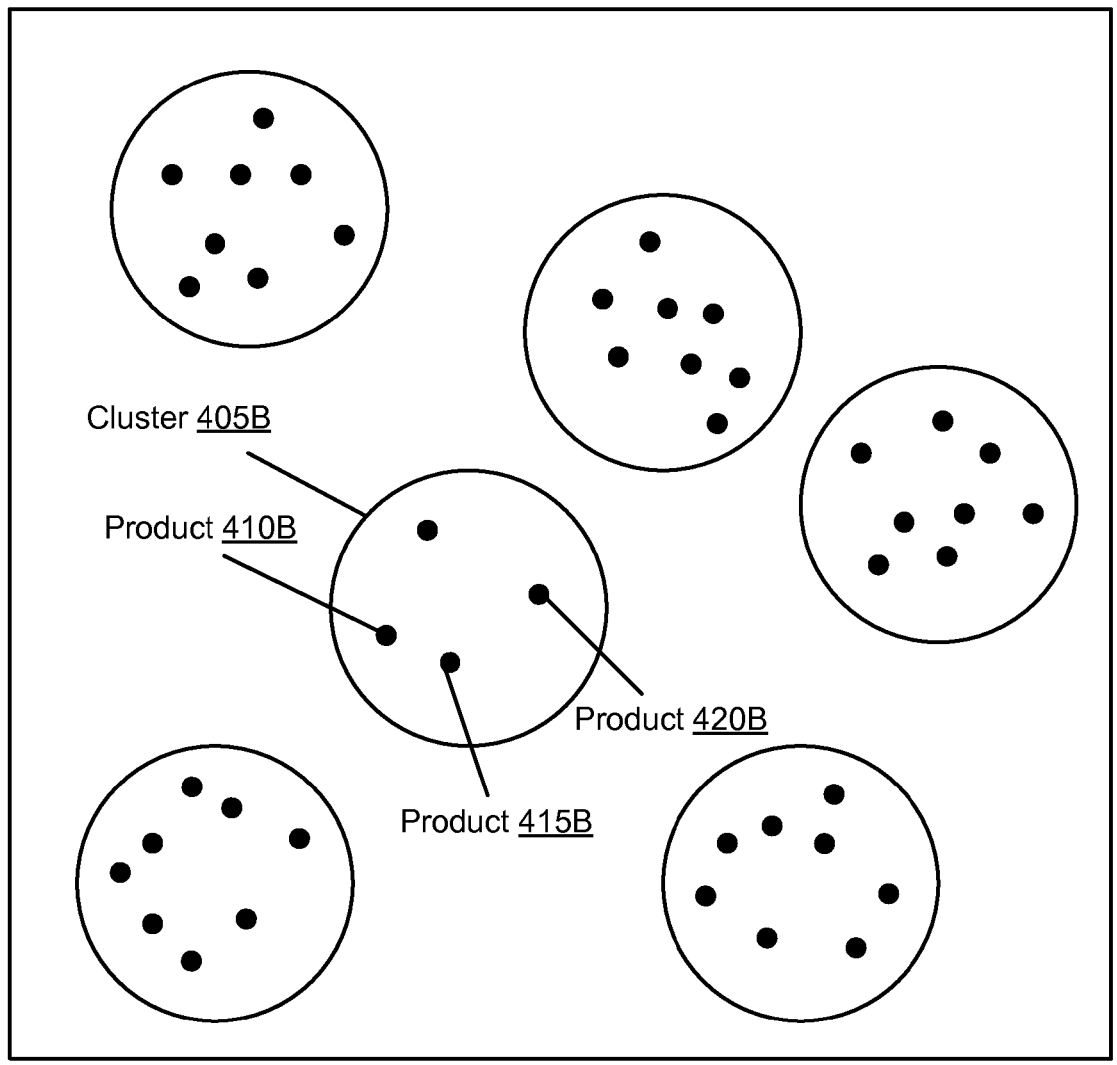
FIG. 4B illustrates a conceptual diagram of a clustering model according to one embodiment.

Referring to FIG. 4B, a conceptual diagram of a number of clusters within a clustering model is illustrated. In FIG. 4B, each cluster is represented by a circle. For example, the model shown in FIG. 4B includes a circle representative of the cluster 405B. Within the cluster 405B are a number of different products, which are represented by the individual dots within the cluster 405B. In FIG. 4B, for example, the cluster 405B includes the products 410B, 415B, and 420B. As further shown in FIG. 4B, the products 410B, 415B, and 420B are each spaced a logical distance from one another. The distances between the products indicate how similar the products are in relation to one another. For example, the products 410B and 415B are closer together than the products 410B and 420B. As such, the products 410B and 415B are more similar than the products 410B and 420B. As will be discussed, the distances between the products of a cluster are used in the selection of product recommendations. In one embodiment, the distance between the products within each cluster can be calculated based on the mutual information metric (MI).

In one embodiment, the model generation module 315 employs the Distributed Exchange Algorithm to generate the clusters and/or logical product arrangements of each cluster for each model. In generating a clustering model, the model generation module 315 first assigns the one or more products into one or more clusters. Thereafter, the model generation module 315 performs multiple clustering iterations on the clusters based on the attributes and/or specific dimensions for the products in order to refine the clusters. The resulting refined clusters can be used for the clustering model.

Product Selection

The selection module 320 selects one or more product recommendations based on a similarity channel selected by a user. More specifically, the selection module 320 may receive a request for product recommendations from the client device 125. The request may indicate a target product to serve as the basis for identification of similar products. The request may additionally indicate a similarity channel to be considered when identifying the similar products. In particular, the similarity channel may specify one or more specific thematic dimensions of the target product that are to also be shared by any similar products. For example, the request may indicate that any similar products share the same specific time period and mood as the specified target product. Responsive to the request, the selection module 320 identifies the thematic categories associated with the dimensions indicated by the request. The selection module 320 then selects the clustering models associated with these thematic categories. Illustratively, referring to the previous example, the selection module 320 may select a model for a time period category and a model for a mood category. For each selected model, the selection module 320 selects a cluster within the model that includes the target product. In this way, identifying similar products can be performed relatively quicker because a portion of each clustering model is searched.

Thereafter, the selection module 320 identifies, from each selected cluster, one or more products that are similar to the target product. The selection module 320 may compute similarity values measuring the relative distances between the target product and each of the other products in a selected cluster. The similarity values can be based on the attributes for the target product and the other products. In one embodiment, only a subset of the product attributes for the target product and the other products in a selected cluster are used to compute the similarity values. In particular, only attributes associated with the thematic category associated with the clustering model of a selected cluster are used. For example, a selected cluster may be part of a clustering model for the plot category. As such, computation of the similarity values for the products in the selected cluster may be based on those attributes associated with the plot category.

In one embodiment, the relative distance between two products may be a function of the number of attributes in which the two products share in common. In particular, the distance between any two products may be shorter as the products have more product attributes that overlap. The distance between any two products may additionally be a function of the relatedness of the attributes associated with the products. For example, a first product may have an attribute "love." A second product in the same cluster may have an attribute "heart." Because the attributes "love" and "heart" are generally closely related, the distance between the two products may be shorter in distance than if one of the attributes were, for instance, the term "football." "Relatedness" can be determined through use of a lexical database that groups attributes into cognitive synonyms. In one embodiment, the computed distance between any two products may be expressed as a mutual information metric value or a TF-IDF metric value.

After computing the similarity values, the selection module 320 selects one or more identified products based on the similarity values. For example, the selection module 320 may select the identified products having a similarity value indicating similarity above a predetermined threshold. Additionally, the selection module 320 may select the N most similar products, where N is an integer such as 5.

Product Ranking

The ranking module 325 merges and ranks the similar products identified by the selection module 320. In one embodiment, the ranking module 325 merges the identified similar products from each clustering model into a single set. The ranking module 325 may normalize the mutual information metric values or TF-IDF metric values for the identified similar products. In this way, products identified from different clustering models can be compared. After merging the products, the ranking module 325 ranks or orders the identified products in the set. In one embodiment, the ranking module 325 may rank the one or more identified products according to the similarity of each product to the target product. In one embodiment, the similarity of each product may be represented by the normalized mutual information metric value or TF-IDF metric value for the product. In the embodiment, more similar products may be ranked higher in the set.

After ranking the one or more products, the ranking module 325 provides a combined ranked list of similar products to the client device 125. In one embodiment, one or more of the similar products in the list may be associated with one or more links, e.g., universal resource locators, etc. Each link may refer to particular webpage, website, or some other entity where the similar product can be purchased.

Method for Generating Clustering Models

Figure 5:
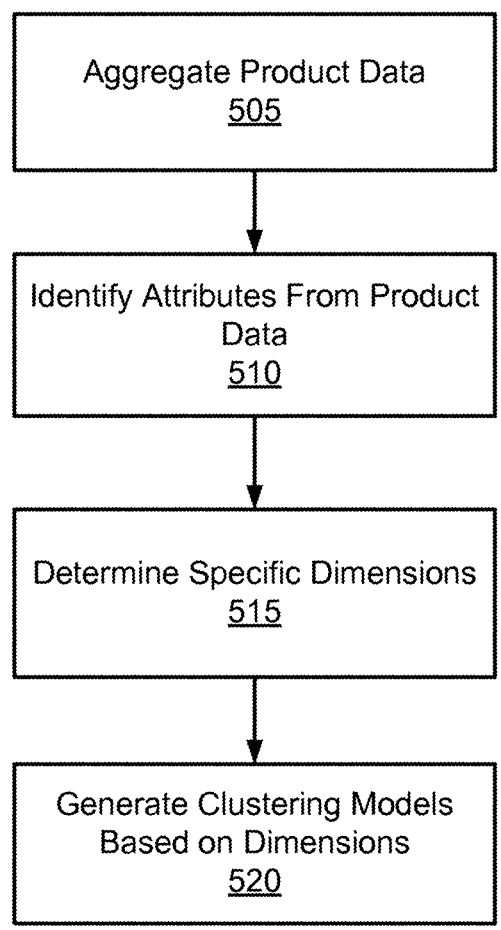
FIG. 5 is a flow chart illustrating a method for generating clustering models usable for supporting the recommendation of products according to one embodiment.

FIG. 5 is a flowchart illustrating a method for generating clustering models usable for supporting the recommendation of products according to one embodiment. Other embodiments can perform the steps of the method in different orders and can include different, additional and/or fewer steps. The method shown in FIG. 5 can be performed by the recommendation module 110.

In particular, the recommendation module 110 begins by aggregating 505 the product data for a set of products. The product data may include any suitable information regarding the products, such as official product descriptions, product user manuals, customer reviews regarding the products, critical reviews of the products, the actual textual contents of the products (e.g. the text of a book, the subtitles of a movie, the lyrics of a song, etc.). Thereafter, the recommendation module 110 identifies 510 attributes for the products by processing the aggregated product data. Subsequently, the recommendation module 110 determines 515 one or more specific dimensions for each product based on the identified attributes. Thereafter, the recommendation module 110 generates 520 clustering models for each of one or more thematic categories based on the products' attributes and/or identified dimensions.

Method for Providing Nuanced Product Recommendations

Figure 6:
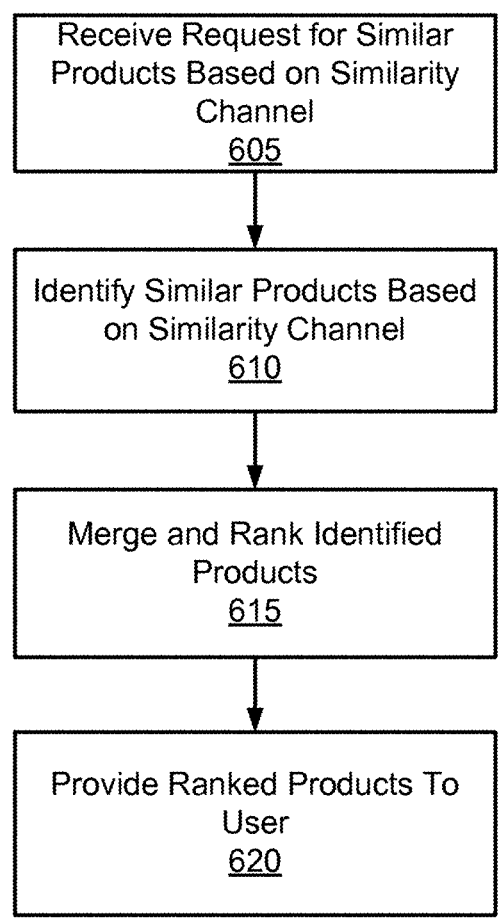
FIG. 6 is a flow chart illustrating a method for recommending products based on similarity channels according to one embodiment.

FIG. 6 is a flowchart illustrating a method for providing nuanced product recommendations based on similarity channels according to one embodiment. Other embodiments can perform the steps of the method in different orders and can include different, additional and/or fewer steps. The method shown in FIG. 6 can be performed by the recommendation module 110.

In particular, the recommendation module 110 begins by receiving 605 a request for similar products from a client device 125. The request may indicate a target product and a similarity channel to be considered in searching for similar products. After receiving the request, the recommendation module 110 identifies 610 one or more similar products. Each of the identified one or more similar products may share at least one dimension in common with the target product, where the dimension is specified by the similarity channel indicated in the request. In one embodiment, the recommendation module 110 identifies the similar products by referencing clustering models associated with the dimensions of the similarity channel. In this way, the products recommended by the recommendation module 110 can each have at least one dimension that is of interest to a requesting user. Thereafter, the recommendation module 110 merges and ranks 615 the identified similar products. In particular, the recommendation module 110 merges the products identified from the different clustering models into a single set of similar products. The recommendation module 110 additionally ranks or orders the similar products in the set based on each product's similarity to the product indicated in the received request. Thereafter, the recommendation module 110 provides 620 a ranked listing of similar products to the client device 125 for display to the requesting user.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A computer-implemented method for providing nuanced product recommendations, the method comprising:

receiving, from a client device, a request to identify products similar to a target product, the request specifying a similarity channel for the target product indicating a user-selected subset of themes selected from a set of themes associated with the target product;

identifying a category associated with a plurality of themes, wherein the plurality of themes includes a user-selected theme indicated by the similarity channel;

selecting a clustering model, from among a plurality of cluster models, that clusters products by the identified category;

identifying a cluster in the selected clustering model that includes the target product and a plurality of other products;

computing similarity values between the target product and the plurality of other products in the identified cluster;

selecting other products in the identified cluster to be included in the set of products similar to the target product responsive to the similarity values; ranking the set of selected products according to a similarity of each product in the set to the target product; and providing the set of ranked products similar to the target product to the client device.

2. The computer-implemented method of claim 1, wherein the user-selected subset of themes is selected by a user of the client device.

3. The computer-implemented method of claim 1, wherein the selected clustering model associated with the identified category includes a plurality of clusters each associated with a different theme from the plurality of themes associated with the identified category, and the identified cluster is identified from among the plurality of clusters.

4. The computer-implemented method of claim 1, wherein computing similarity values comprises:

determining a set of shared product attributes that the target product and an other product in the identified cluster have in common; and computing a similarity value between the other product and the target product based on a number of attributes in the set of shared product attributes.

5. The computer-implemented method of claim 1, wherein computing similarity values comprises:

determining target product attributes associated with the target product and other product attributes associated with an other product in the identified cluster; and computing a similarity value between the other product and the target product based at least in part on a determined relatedness of the target product attributes and the other product attributes.

6. The computer-implemented method of claim 1, wherein the similarity channel specified by the request indicates a plurality of user-themes, wherein the set of products similar to the target product comprises a plurality of groups of products similar to the target product, wherein each group of products is associated with a theme of the plurality of themes, and wherein ranking the set of identified products comprises:

determining a similarity value for each product in the plurality of groups of products similar to the target product; and combining the products in the plurality of groups into a ranked list of products responsive to the determined similarity values.

7. A non-transitory computer-readable medium storing executable computer program instructions for providing nuanced product recommendations, the computer program instructions comprising instructions for:

receiving, from a client device, a request to identify products similar to a target product, the request specifying a similarity channel for the target product indicating a user-selected subset of themes selected from a set of themes associated with the target product;

identifying a category associated with a plurality of themes, wherein the plurality of themes includes a user-selected theme indicated by the similarity channel;

selecting a clustering model, from among a plurality of cluster models, that clusters products by the identified category;

identifying a cluster in the selected clustering model that includes the target product and a plurality of other products;

computing similarity values between the target product and the plurality of other products in the identified cluster;

selecting other products in the identified cluster to be included in the set of products similar to the target product responsive to the similarity values; ranking the set of selected products according to a similarity of each product in the set to the target product; and providing the set of ranked products similar to the target product to the client device.

8. The computer-readable medium of claim 7, wherein the user-selected subset of themes is selected by a user of the client device.

9. The computer-readable medium of claim 7, wherein the selected clustering model associated with the identified category includes a plurality of clusters each associated with a different theme from the plurality of themes associated with the identified category, and the identified cluster is identified from among the plurality of clusters.

10. The computer-readable medium of claim 7, wherein computing similarity values comprises:
   determining a set of shared product attributes that the target product and an other product in the identified cluster have in common; and
   computing a similarity value between the other product and the target product based on a number of attributes in the set of shared product attributes.

11. The computer-readable medium of claim 7, wherein computing similarity values comprises:
   determining target product attributes associated with the target product and other product attributes associated with an other product in the identified cluster; and
   computing a similarity value between the other product and the target product based at least in part on a determined relatedness of the target product attributes and the other product attributes.

12. The computer-readable medium of claim 7, wherein the similarity channel specified by the request indicates a plurality of user-themes,
   wherein the set of products similar to the target product comprises a plurality of groups of products similar to the target product, wherein each group of products is associated with a theme of the plurality of themes, and
   wherein ranking the set of identified products comprises:
      determining a similarity value for each product in the plurality of groups of products similar to the target product; and
      combining the products in the plurality of groups into a ranked list of products responsive to the determined similarity values.

13. A system for providing nuanced product recommendations, the system comprising:
   a non-transitory computer-readable storage medium storing executable computer program instructions comprising instructions for:
      receiving, from a client device, a request to identify products similar to a target product, the request specifying a similarity channel for the target product indicating a user-selected subset of themes selected from a set of themes associated with the target product;
      identifying a category associated with a plurality of themes, wherein the plurality of themes includes a user-selected theme indicated by the similarity channel;
      selecting a clustering model, from among a plurality of cluster models, that clusters products by the identified category;
      identifying a cluster in the selected clustering model that includes the target product and a plurality of other products;
      computing similarity values between the target product and the plurality of other products in the identified cluster;
      selecting other products in the identified cluster to be included in the set of products similar to the target product responsive to the similarity values;
      ranking the set of selected products according to a similarity of each product in the set to the target product; and
      providing the set of ranked products similar to the target product to the client device; and
   a processor for executing the computer program instructions.

14. The system of claim 13, wherein, the user-selected subset of themes is selected by a user of the client device.

15. The system of claim 13, wherein the selected clustering model associated with the identified category includes a plurality of clusters each associated with a different theme from the plurality of themes associated with the identified category, and the identified cluster is identified from among the plurality of clusters.

16. The system of claim 13, wherein computing similarity values comprises:
   determining a set of shared product attributes that the target product and an other product in the identified cluster have in common; and
   computing a similarity value between the other product and the target product based on a number of attributes in the set of shared product attributes.

17. The system of claim 13, wherein computing similarity values comprises:
   determining target product attributes associated with the target product and other product attributes associated with an other product in the identified cluster; and
   computing a similarity value between the other product and the target product based at least in part on a determined relatedness of the target product attributes and the other product attributes.

18. The system of claim 13, wherein the similarity channel specified by the request indicates a plurality of user-themes,
   wherein the set of products similar to the target product comprises a plurality of groups of products similar to the target product, wherein each group of products is associated with a theme of the plurality of themes, and
   wherein ranking the set of identified products comprises:
      determining a similarity value for each product in the plurality of groups of products similar to the target product; and combining the products in the plurality of groups into a ranked list of products responsive to the determined similarity values.

\* \* \* \* \*